Figure 1:
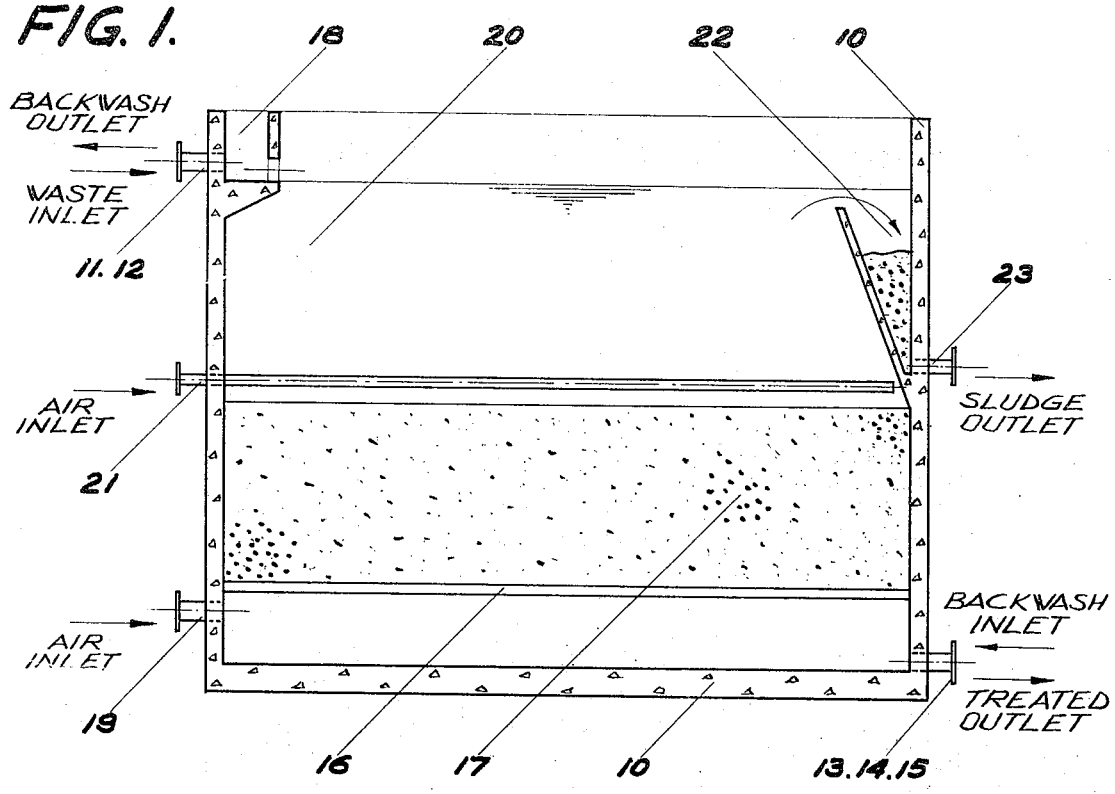

United States Patent [19]
Tymoszczuk

[11] 3,853,752
[45] Dec. 10, 1974

[54] PROCESS AND APPARATUS FOR TREATING WASTES BY A COMBINED ACTIVATED SLUDGE AND BIOLOGICAL FILTER BED

[76] Inventor: Jerzy Tymoszczuk, 3615 Prud'homme Ave., Apt. 11, Quebec, Canada

[22] Filed: Dec. 21, 1970

[21] Appl. No.: 100,220

[52] U.S. Cl.................. 210/17, 210/150, 210/261, 210/268
[51] Int. Cl............................................ C02c 1/04
[58] Field of Search............ 210/17, 150, 261, 151, 210/268, 3–8, 275

[56] References Cited
UNITED STATES PATENTS

| | | | |
|---|---|---|---|
| 2,348,854 | 5/1944 | Schreiber | 210/3 |
| 2,364,298 | 12/1944 | Kamp | 210/150 |
| 2,388,795 | 11/1945 | Montgomery et al. | 210/17 |
| 3,220,706 | 11/1965 | Valdespino | 210/14 X |
| 3,563,385 | 2/1971 | Bykov | 210/268 |

FOREIGN PATENTS OR APPLICATIONS

| | | | |
|---|---|---|---|
| 542,008 | 12/1941 | Great Britain | 210/151 |
| 971,338 | 9/1964 | Great Britain | 210/17 |

Primary Examiner—Samih N. Zaharna
Assistant Examiner—Benoit Castel
Attorney, Agent, or Firm—Smart & Biggar

[57] ABSTRACT

This invention relates to an improvement in aerobic biological processes for treating waste fluids or sewage.

18 Claims, 8 Drawing Figures

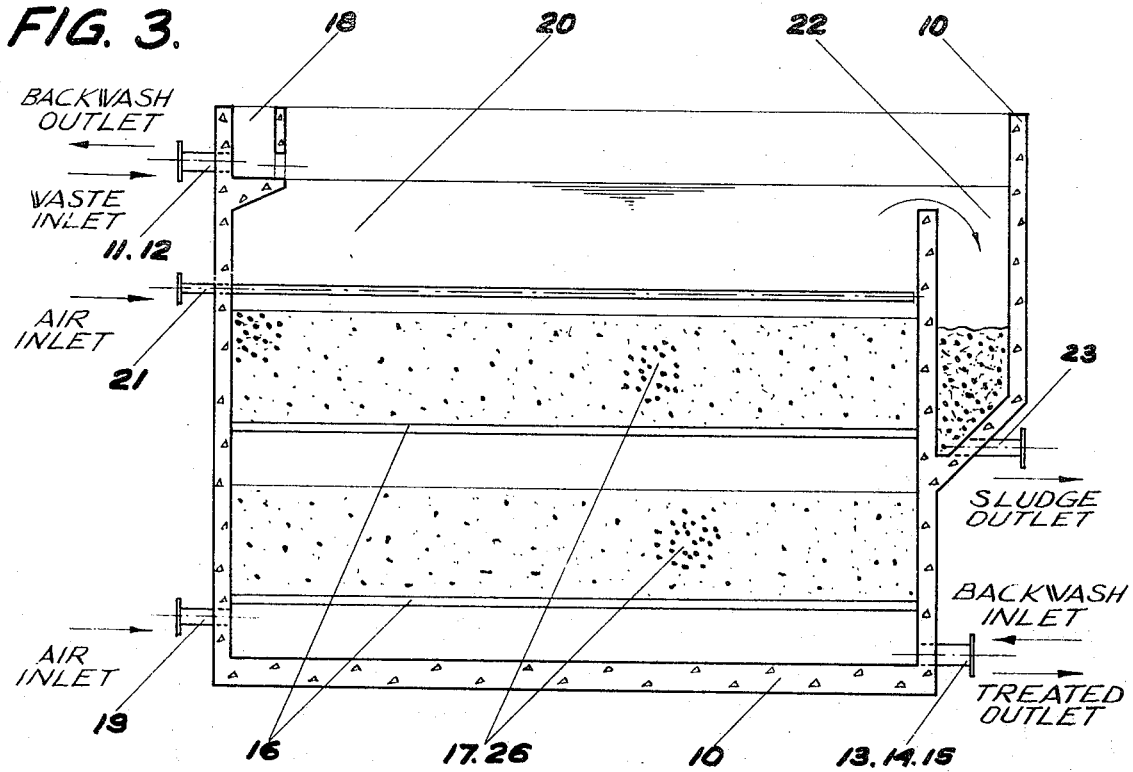
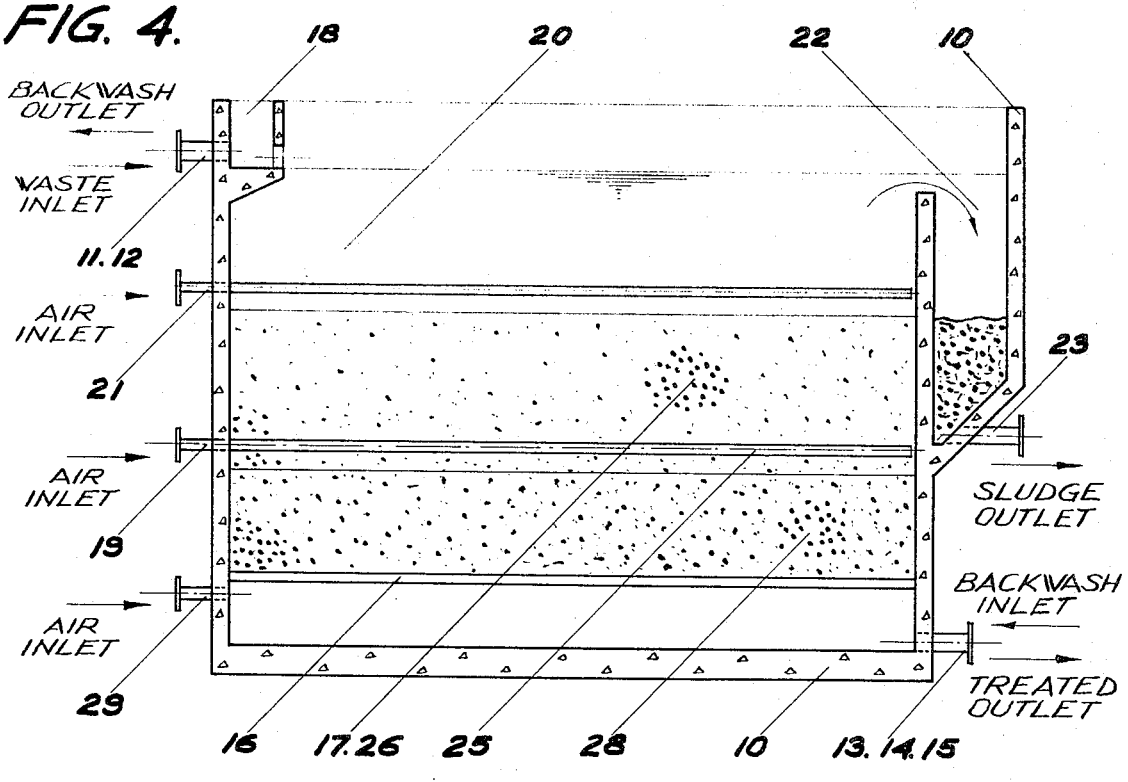

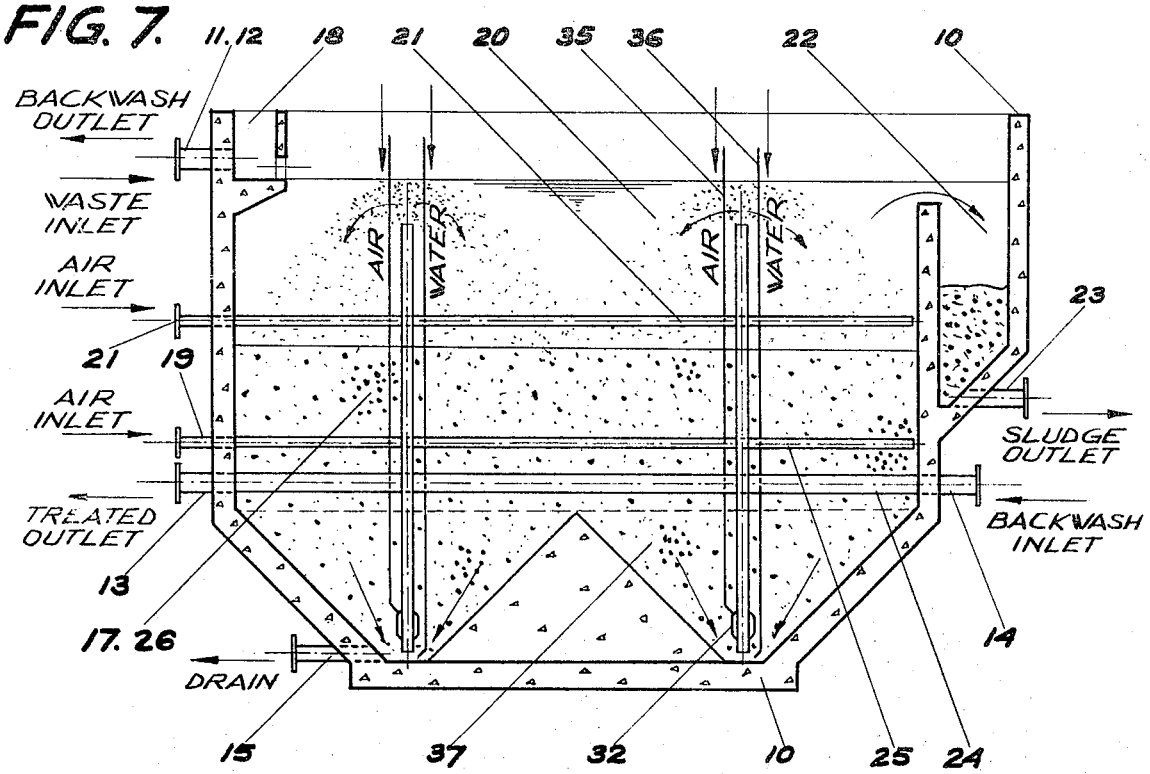
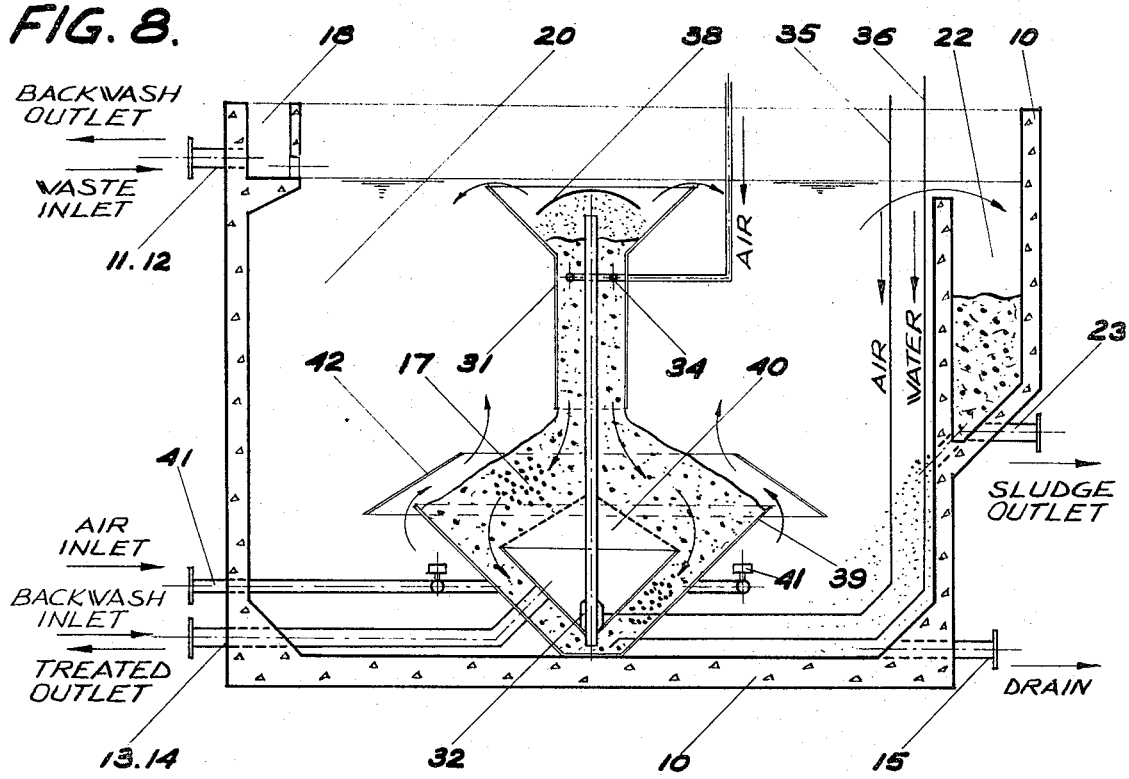

PROCESS AND APPARATUS FOR TREATING WASTES BY A COMBINED ACTIVATED SLUDGE AND BIOLOGICAL FILTER BED

Until now the aerobic biological process of puryfing wastes and sewage has generally been carried out by three methods: (a.) activated sludge, (b.) trickling filters and (c.) irrigation. In the past were also used submerged filters with or without aeration, however, these have been abandoned due to difficulties in operation and low treatment efficiencies. The two processes most commonly employed presently are the activated sludge and trickling filters processes.

In as much as these systems are economical and effective, nevertheless they require, for a complete biological purification, by necessity primary and secondary clarifiers. In the case of activated sludge they require large quantities of air and large tanks providing for long aeration times. In the case of trickling filters they require large structures, present operational problems under cold temperature conditions and have odour problems. In addition to the above deficiencies, these processes are being supplemented by a tertiary treatment step to achieve a more complete degree of treatment.

The aim of the present invention is to do away with the above deficiencies and provide a very high degree of biological purification in an extremely reduced period of time and with a minimum requirement of compressed air as well as reducing a large amount of concrete or other construction thus providing substantial economic benefits and further give the possibility of eliminating the necessity for primary and secondary clarifiers. In addition when the apparatus described in this invention is used in a multiple step arrangement it so purifies the wastes as to allow them to be recycled and reused directly in water supply systems. These advantages are incorporated by the present invention "Process and apparatus for treating wastes by a combined Activated Sludge and Biological Filter Bed."

The essence of the invention consists in combining the activated sludge process with Aerated Biological Filters and non-aerated Biological filter beds. These filter beds are similar to presently existing rapid sand filters used for potable water treatment. In the present invention in its basic form, the treatment of the wastes takes place in one unit, the waste passes first through the upper part which is the activated sludge compartment and into lower part which is the aerated biological filter bed. Because of this arrangement, the air introduced at the bottom of the aerated biological filter bed traverses the bed and above the bed aerates the activated sludge compartment. In this basic form the invention provides a two stage biological treatment process in one chamber, using a single stage of aeration in which the first stage is the Activated Sludge process and the second stage is the Aerated Biological Filter Bed process. The A.B.F.B. filters the effluent from the activated sludge stage eliminating the need for a secondary clarifier, in addition the bacteria developed on the media further purifies the wastes producing a more complete biological treatment. The activated sludge stage gives the possibility of eliminating the need for a primary clarifier.

The aeration of the A.B.F.B. creates three conditions, namely: (a.) the oxygenation of the bacteria which has developed in the media, (b.) the scouring of excess bacteria into the activated sludge zone, and (c.) maintains a constant porosity of the filter media with the result that the flow of wastes through the media is maintained without an excessive head loss. The wastes treated by this process are fully treated biologically and following sterilization are discharged to the receving body. When this process is repeated in a multiple step arrangement the purification efficiency is extremely high.

The object of the invention consists of a unit described as follows.

The activated sludge (1st stage) operates under accepted present day parameters for this process within a wide range of B.O.D. loadings and mixed liquor S.S. concentrations. In the context of the present invention, to reduce compartment volumes and cost, the B.O.D. loadings and M.L.S.S. concentrations are very high and the retention time is very low. This results in a lower B.O.D. removal efficiency, which, however, is fully compensated by the B.O.D. removal of the 2nd stage namely the A.B.F.B.

If it is necessary to supply additional air for the activated sludge stage, a supplementary aeration system can be provided using diffused air or mechanical aeration or by using a diffuser grid placed in the upper layer of the media.

The introduction of wastes to the activated sludge compartment is carried out by conventional accepted techniques.

The extraction of excess sludge from the activated sludge (1st stage) compartment takes place in a specially designed sludge concentrator thus reducing the volume of sludge withdrawn. This concentrator, may in certain cases, be placed external to the unit or even completely separated from the unit. The concentrator may be constructed in such a manner as to include a gravity recirculation or by means of an air lift or other pumping device. This sludge is then processed according to available and desirable techniques. A part of this excess sludge, where process parameters require it, is returned to the activated sludge compartment.

The Aerated Biological Filter Bed (2nd stage) is designed and executed similarily to present day rapid sand potable water filters with the exception that the filter bed contains a biological mass and during operation is aerated. The quantity of air required and the media size is a function of the nature of the wastes to be treated or of the efficiency of treatment desired. Furthermore, whenever required, the A.B.F.B. is backwashed. The backwashing may be carried out in one of two ways; (a.) increasing the amount of air without stopping the operation of the filter or (b.) using a combination of air and water according to known present day techniques. In both the above cases the excess material which was removed from the bed is collected in the sludge concentrator and from there withdrawn.

Backwash water may consist of purified waste or some outside supply of water. Backwash effluent will be recirculated to the head of the plant. The time of backwash will not exceed 20 minutes and following this the A.B.F.B. is again placed in service. The length of operation between backwashings will be a function of media sizing, media depth, as well as the desired degree of purification of any given wastes and will be governed by the quality of the effluent.

The essential function of the A.B.F.B. is the guarantee of providing a high level of B.O.D. reduction in a very short time by utilizing the extremely large surface area provided by the media. This media provides for both bio-coagulation and mineralization of organic materials which are remaining in the form of colloidal suspensions or dissolved compounds after passing through the activated sludge compartment.

To achieve the above aims compressed air is provided at the bottom of the filter either continuously, in varying capacity or cyclically.

The flow of sewage through the A.B.F.B. can be upwards or downwards as desired. The filter media may employ sand, gravel, anthracite, activated carbon or any other suitable material of varying sizes and densities and in various combinations. The construction of the distribution and/or collection system for both wastes and air is similar to known techniques currently employed. This includes filters equipped with a false bottom and strainers as well as filters equipped with underdrain piping systems or tile blocks or porcelain balls, etc. The size of the filters, as well as the quantity of air, the depth of the media, the size of the particles as well as other construction details are a function of the wastes and the degree of purification required. The time of contact between the wastes and the bed for a full biological purification will, by principle, be very short and the quantity of air required will be very small.

Variants of the A.B.F.B. can be constructed in multiple layers as desired within one or more than one structures. The various layers can have different sizes and different specific gravities as required by the specific design conditions. Air introduction will take place at the bottom of the unit and further air may be introduced by a distribution grid at any height in the bed. A variant of the invention combines in one or more structures an active aerated biological layer followed by a pure filtration layer where air introduction takes place above the pure filtering layer. The filtering layer may be directly underneath the biological layer or may be separated by a false floor.

An alternate arrangement would consist of placing an effluent grid collector within the media. The aerated waste thus flows from below and from above the bed and is collected by the grid and is discharged.

All the above variants operate, are aerated and are backwashed in the same manner as the basic single media A.B.F.B. Another variant consists of a basic A.B.F.B. in which is incorporated a moving layer of sand which is recirculated by an air lift to a central trough or point. The waste flows from top to bottom and the air from bottom to top. The moving layer of sand is at the top of the filter and is the layer which becomes most clogged. This layer falls into sloping pits besides the bed from which the air lift recirculates this layer and at the same time backwashes it. The recirculated sand is discharged in an open channel or pipe placed in the upper part of the unit where a secondary air inlet promotes the washing of the sand.

In the variation of the above the whole sand bed is recirculated using an air lift device in a unit with one or more conic hoppers at the bottom and an air lift in the central part of the hopper. Buried in the upper layer of the media is an air distribution grid and a grid which collects treated wastes and which returns backwash water when the unit needs backwashing.

Another variation of the above consists of a recirculating sand unit which is not aerated but acts solely as a filter. The sand is contained in a central conic section in the middle of which the treated effluent is collected. As the sand moves to the bottom of the hopper it is recirculated by an air lift to an open chanel across the tank or a pipe in the upper part of the unit. At this point a further introduction of air serves to backwash the sand. All around this central conic section is the activated sludge unit which is aerated by separate and conventional air introducing devices.

Furthermore all the above variants as well as the basic unit may be installed in various shapes and configurations as well as in series, also in existing units such as primary clarifiers, activated sludge units, combined high-rate complete air units and other existing works to increase their capacity and/or improve their efficiency.

The object of the invention is further described in the attached drawings.

FIG. 1 shows a section of the apparatus for treating wastes by a combined activated sludge and biological filter bed with single media, aerated from underneath, with wastes flowing from top to bottom, with an integral sludge concentrator and with a supplementary aeration system for the activated sludge compartment.

Figure 2:
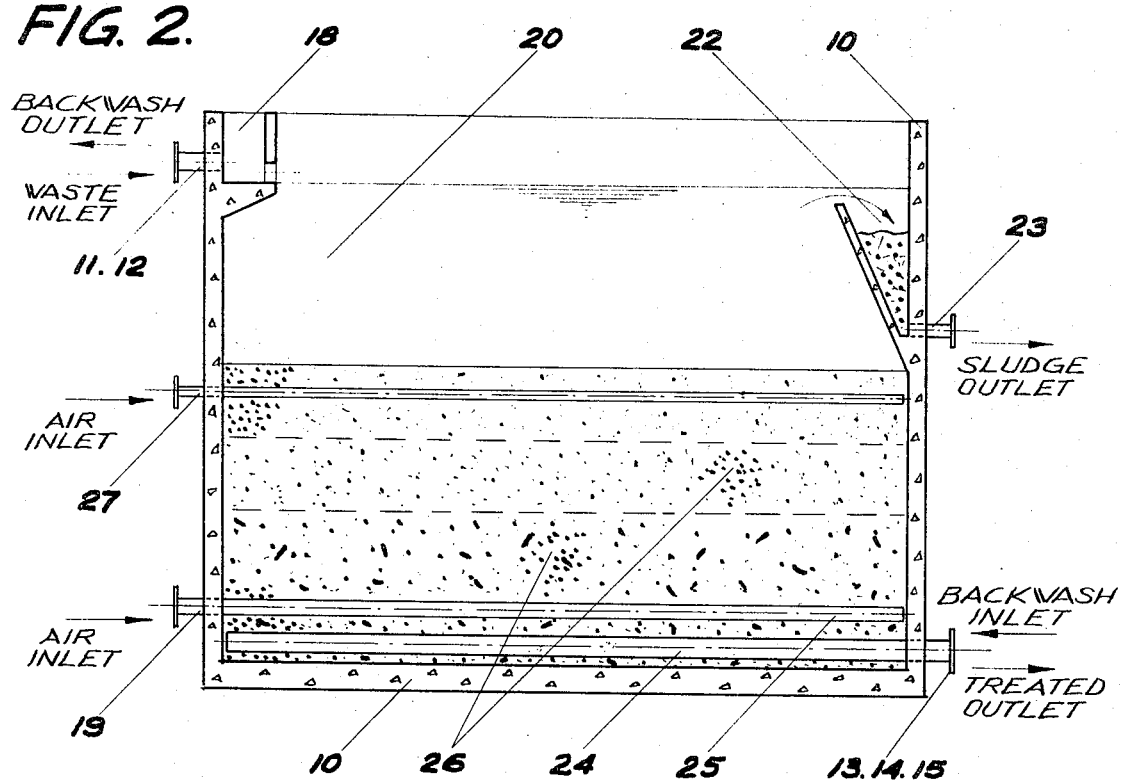

FIG. 2 as FIG. 1 but showing multiple layer media and with a supplementary aeration grid in the top layer of the media.

FIG. 3 as FIG. 2 but with separated multiple layers.

FIG. 4 as FIG. 1 and FIG. 2 but having a non-aerated filtering layer.

Figure 5:
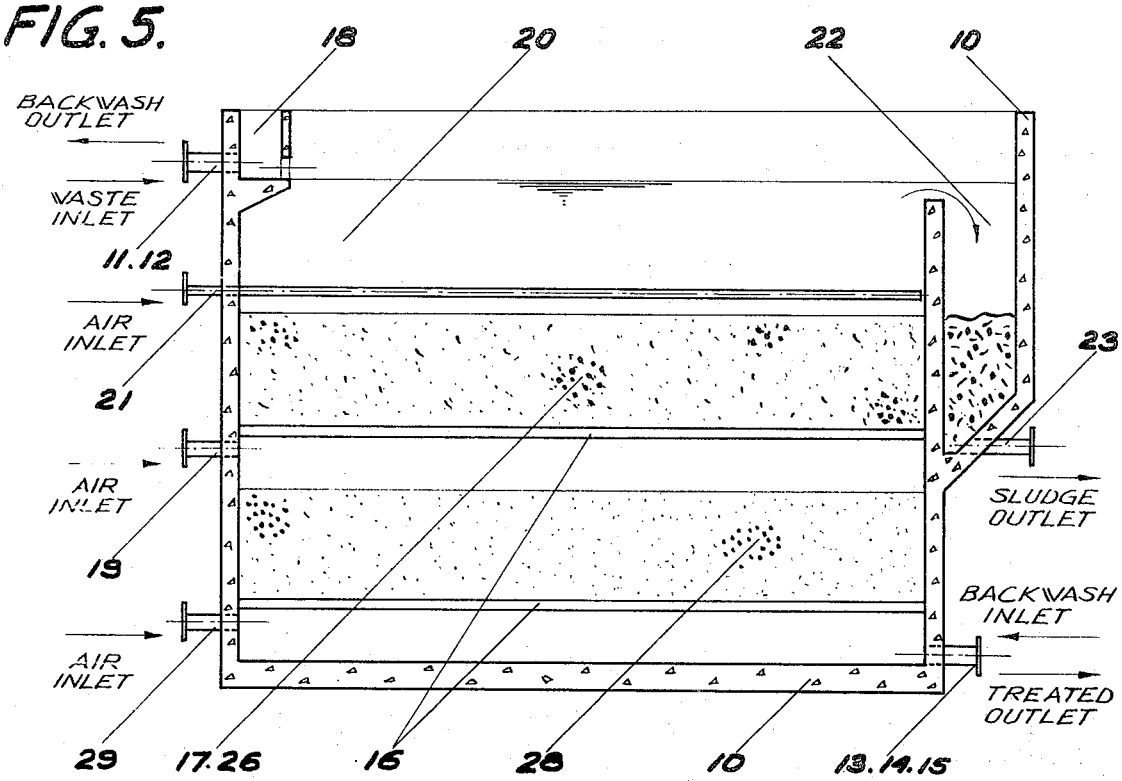

FIG. 5 as FIG. 4 but with separated layers.

Figure 6:
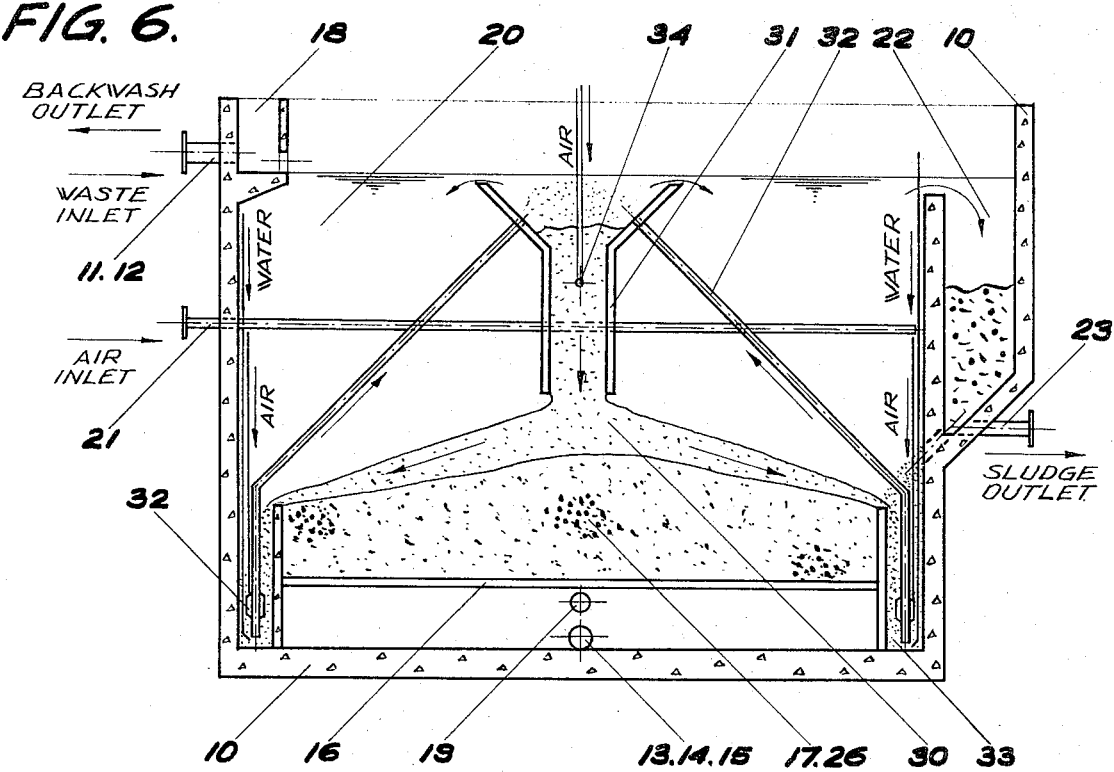

FIG. 6 as FIG. 1 but incorporating a mowing upper layer.

FIG. 7 as FIG. 1 but incorporating a complete recirculation of the media.

FIG. 8 as FIG. 7 but incorporating a non-aerated recirculating media.

Referring to FIG. 1 the invention consists of an open or closed tank 10 of any shape which may be constructed of any suitable material, equipped with an inlet connection 11 which is also a backwash outlet 12 and an effluent discharge nozzle 13 which also acts as a backwash inlet nozzle 14 and drain nozzle 15. In the tank there is a false filter floor 16 which supports a single aerated biological filter bed 17. The influent can be distributed by a pipe or trough 18 or other conventional methods. The air required for aeration of the media and backwash is supplied through nozzle 19 under the false floor 16. The air which aerates the A.B.F.B. rises to the activated sludge compartment 20. Additional air for the aeration of the activated sludge compartment is provided through a diffusion system 21. The excess sludge in the activated sludge compartment 20 is gathered in a concentrator section 22 from which it is extracted through a nozzle 23. The concentrator 22 also is used to collect the backwash water when the filter is being washed.

FIG. 2 as FIG. 1 but this configuration does not have a false floor 16 but an effluent grid collector 24 and an air distribution grid 25. In addition it has multiple layers 26 of A.B.F.B. An additional air supply for the activated sludge process is provided by an aeration grid 27 in the upper part of the A.B.F.B.

FIG. 3 as in preceeding figures but in which the A.B.F.B. are separated by two or more false floors. Each A.B.F.B. may be single 17 or multiple media 26.

FIG. 4 shows a multilayer arrengement in which the bottom layer 28 is a non aerated biological filter bed. Inlet nozzle 29 is used for air supply during the backwashing period.

FIG. 5 as in FIG. 4 but in which the A.B.F.B. are separated by two or more false floors 16. The upper layer is aerated through inlet 21 and the lower layer is non-aerated.

FIG. 6 shows an A.B.F.B. in which the upper layer of the media 30 is continually moving due to the arrival of new media from an open chamber or central well 31. The sand arrives at the central well by an air lift 32 and is lifted from a pit 33. When the sand arrives at the upper well which is enlarged, an additional air supply 34 washes the sand. The backwash effluent is removed to the activated sludge compartment. The lower layer of the media 17 and 26 is stationary and aerated and can be backwashed when required.

FIG. 7 shows a unit as FIG. 1 but in which the whole media is recirculating by means of an air lift 32 operated by air 35 or air and water 36. The lower part of the media rests in a conic section 37. Above the conic section, the A.B.F.B. remains as mentioned above. At the discharge of the air lift the sand is washed. The upper layer is backwashed when required by grid 24 and grid 25.

FIG. 8 shows a moving non aerated biological filter bed in which the sand is recirculated by an air lift 32 and discharged to an open chamber or central well 31. A deflector 38 prevents the sand from being carried over. The central unit 39 can be a trough or simply a central cone. The treated effluent is collected in a central compartment 40 perforated at its upper surface from which it is discharged by connection 13. The activated sludge compartment is aerated by an air diffusion system 41. A baffle 42 initiates of scouring flow at the filter surface.

In all the above arrangements a spray system is installed above the sludge concentrators as required.

I claim:

1. A process for the treatment of sewage and the like, said process comprising: maintaining a submerged biological filter bed zone containing finely divided, particulate filter media; maintaining an activated sludge zone in upstream fluid flow relationship to said biological filter bed zone; feeding sewage or the like to be treated to said activated sludge zone; aerating both said biological filter bed zone and said activated sludge zone; withdrawing treated effluent from said biological filter bed zone; and backwashing said biological filter bed zone as often as required to maintain the operating effectiveness of said biological filter bed zone and an acceptable head at the point of withdrawal of the treated effluent, an upper layer of said filter media being transported to a conduit positioned in said activated sludge zone, said conduit having an upper inlet end for the transported filter media and a lower outlet end through which said transported filter media is returned to said upper layer of said filter media, the said transported filter media being aerated during the passage thereof through said conduit.

2. The process according to claim 1, wherein the sewage or like is fed to the biological filter bed zone in an upstream fluid flow relationship to the activated sludge zone.

3. The process according to claim 1, wherein sludge is concentrated in an activated sludge concentrating zone adjacent to and in communication with said activated sludge zone for removal therefrom.

4. A process as claimed in claim 1, in which the sewage or the like is fed through said filter bed zone and said activated sludge zone under pressure.

5. A process as claimed in claim 1, in which the sewage or the like is drawn through said filter bed zone and said activated sludge zone under vacuum.

6. A process as claimed in claim 1, in which at least a portion of the filtering media is circulated to enable said backwashing to be carried out continuously.

7. A process as claimed in claim 6, in which at least part of the circulating filter media is aerated.

8. A process as claimed in claim 1, in which air is fed into the bottom portion of the biological filter bed zone.

9. A process as claimed in claim 1, in which air is fed into the bottom portion of the activated sludge zone.

10. A process as claimed in claim 1, in which said aerating is carried out intermittently.

11. A process as claimed in claim 1, in which aeration is carried out with a gas selected from oxygen and oxygen-enriched air.

12. Apparatus for the treatment of sewage and the like, said apparatus comprising: means for maintaining a submerged biological filter bed zone containing finely divided, particulate filter media; means for maintaining an activated sludge zone in upstream fluid flow relationship to said biological filter bed zone; means for supplying sewage or the like to said activated sludge zone; means for aerating said biological filter bed zone and said activated sludge zone; means for removing treated effluent from said biological filter zone; means for backwashing said biological filter bed; and means for removing backwashings from a point upstream from the said filter bed zone, said apparatus further comprising means for transporting an upper layer of said filter media, a conduit positioned in said activated sludge zone, said conduit having an upper inlet end for the transported filter media and a lower outlet end through which transported filter media is returned to said upper layer of said filter media, and means for aerating said filter media as it passes through said conduit.

13. An apparatus as claimed in claim 12, that includes an activated sludge concentrator operatively associated with said means for maintaining an activated sludge zone.

14. An apparatus as claimed in claim 13 that includes means to reduce the amount of foam in said sludge concentrator.

15. An apparatus as claimed in claim 13, in which the sludge concentrator is open at the bottom to allow a recirculation of the sludge.

16. An apparatus as claimed in claim 12, including means to circulate said filter media.

17. An apparatus as claimed in claim 16, in which said means to circulate said filter media is an air lift.

18. An apparatus as claimed in claim 16, including means to aerate at least part of the circulated filter media.

* * * * *